May 26, 1959 M. DE GROOTE ET AL 2,888,403
PROCESS FOR BREAKING EMULSIONS EMPLOYING LACTONE-DERIVED
COMPOUNDS OF CERTAIN OXYALKYLATED RESINS
Filed Oct. 5, 1953
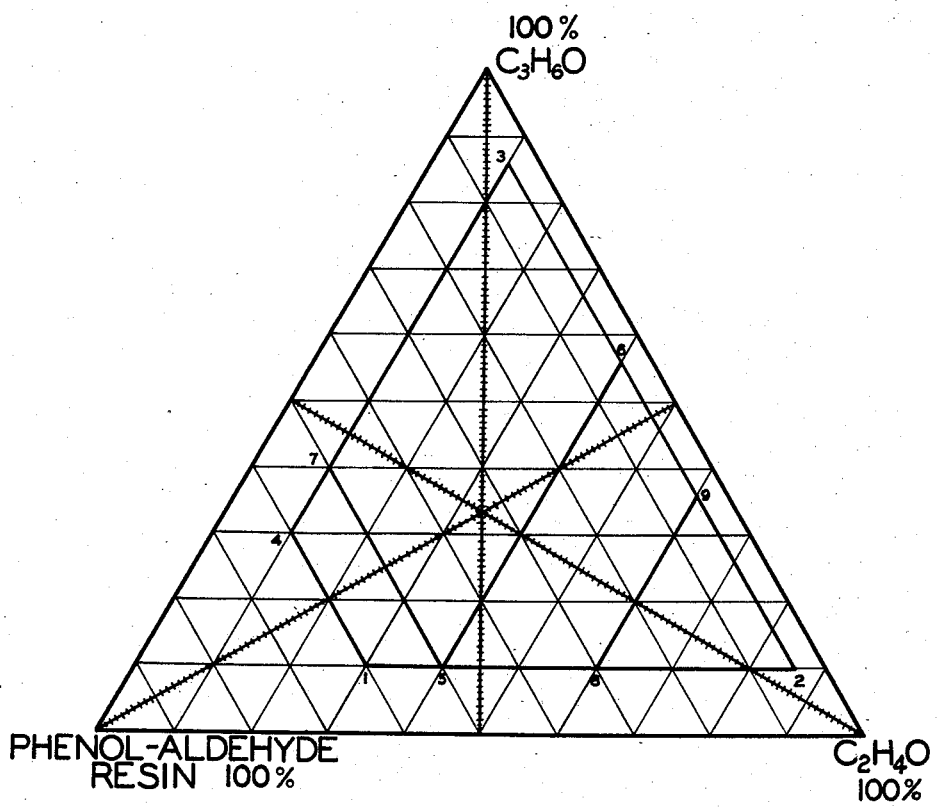
INVENTORS United States Patent Office 2,888,403
Patented May 26, 1959

2,888,403
PROCESS FOR BREAKING EMULSIONS EMPLOYING LACTONE-DERIVED COMPOUNDS OF CERTAIN OXYALKYLATED RESINS

Melvin De Groote, University City, and Kwan-Ting Shen, Brentwood, Mo., assignors to Petrolite Corporation, Wilmington, Del., a corporation of Delaware Application October 5, 1953, Serial No. 384,307

8 Claims. (Cl. 252—342)

This invention relates to processes or procedures particularly adapted for preventing, breaking, or resolving emulsions of the water-in-oil type and particularly petroleum emulsions.

Our invention provides an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly, inorganic salts, from pipeline oil.

The present invention is concerned with a process for breaking petroleum emulsions employing a demulsifier including products obtained by chemically modifying certain polyols, as hereinafter specified, with beta propiolactone, or its equivalent, under substantially anhydrous conditions in the absence of a basic catalyst and preferably in the presence of an acid catalyst, to yield fusible (non-thermosetting) derivatives. The polyols employed are oxyalkylated hydrophile synthetic derivatives of certain phenol-aldehyde resins.

The preparation of hydrophile synthetic products, which are in essence polyols by the oxyalkylation of phenolaldehyde resins is well known and has been described in considerable detail in a large number of United States patents; for instance, United States Patents Nos. 2,499,365, 2,499,366, 2,499,367, 2,499,368 and 2,499,370, all dated March 7, 1950, and all to De Groote and Keiser. The preferred types of those particularly suitable for the present purpose are those described in the last mentioned patents with the proviso that the substituent radical may have as many as 18 carbon atoms. Reference is made also to U.S. Patent No. 2,557,081 dated June, 1951, to De Groote and Keiser.

Briefly stated, the manufacturing method herein employed is to react an oxyalkylated phenol resin of the kind described in the various above mentioned patents with beta-propiolactone or its equivalent in a ratio so there are employed preferably at least two moles of the lactone for each oxyalkylated resin molecule.

In our co-pending applications, Serial Nos. 343,804, filed March 20, 1953 (now abandoned), and 349,972, filed April 20, 1953 (now U.S. Patent 2,792,353, dated May 14, 1957), we have described more complicated oxyalkylation derivatives in which oxyalkylated resins were united by means of a polyepoxide, particularly a diglycidyl ether. Such polyepoxide derivatives also may be treated with a suitable beta-lactone in the manner herein described. The resultant products are suitable for the same purpose and particularly for the resolution of petroleum emulsions of the water-in-oil type.

As far as we are aware the only suitable beta-lactone commercially available is beta-propiolactone. Other similar lactones and particularly those having less than 6 carbon atoms, such as beta-butyrolactone and beta-methyl-beta-butyrolactone, can be prepared by any well known procedure such as described, for example, in U.S. Patent No. 2,469,110, dated May 3, 1949, to Hagemeyer Jr.

A number of other beta-lactones could be employed and particularly those having less than 6 carbon atoms. Stated another way, the lactones which are suitable are the beta-lactones of monocarboxylic acids having at least one unsubstituted hydrogen atom on the alpha-carbon atom and containing only unreactive hydrocarbon substituents. Structurally, these beta-lactones possess the formula

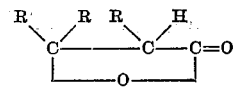

wherein R is a hydrogen or unreactive hydrocarbon radical such as alkyl, aryl, aralkyl, or a cycloalkyl radical. Included in this class of compounds are the beta-lactones of saturated aliphatic monocarboxylic acids containing at least one hydrogen atom on the alpha carbon atom such as beta-propiolactone, beta-butyrolactone, alpha-methyl-beta-propiolactone, beta-valerolactone, alpha-methyl-butyrolactone, alpha-ethyl-beta-propiolactone, beta-isovalerolactone, beta-n-caprolactone, alpha-methyl-beta-valerolactone, beta-methyl-beta-ethyl-beta-propiolactone, alpha-methyl-beta-ethyl-beta-propiolactone, alpha-methyl-beta-methyl-beta-propiolactone, alpha-propyl-beta-propiolactone, alpha-butyl-beta-propiolactone, beta-methyl-beta-propyl-beta-propiolactone and the like; the beta-lactones of aryl-substituted carboxylic acids such as beta-phenyl-beta-propiolactone, alpha-phenyl-beta-propiolactone, and other beta-lactones of substituted carboxylic acids such as beta-cyclohexyl-beta-propiolactone, beta-benzyl-beta-propiolactone, alpha-cyclohexyl-beta-propiolactone and the like. The preferred compounds are the beta-lactones containing less than 6 carbon atoms, particularly the low molecular weight aliphatic beta-lactones since the difficulty of carrying out the reaction is increased when employing lactones of higher molecular weight.

Reference is made to the fact that no attempt has been made to point out the exact nature, at least quantitatively, of the modification which takes place when a polyol is reacted with beta-propiolactone or the like. The procedure simply has been referred to as "chemically modifying" the polyol.

Returning now to a comparable reaction, except that obviously it is more simple, is the one involving a monohydric alcohol such as methanol and propiolactone:

"The action of an alcohol varies with the pH. In alkaline solution a glycollic ester, and in acid solution a glycollic ether is produced:

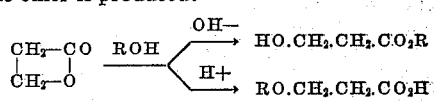

In all these reactions a certain amount of polymeric material, e.g.

Cl.CH$_2$.CH$_2$.COO(CH$_2$.CH$_2$.COO)$_x$.CH$_2$.CH$_2$CO$_2$H is formed."

(See Chemistry of Carbon Compounds, Rodd, vol. I, part B, Elsevier Publishing Co., New York, N. Y., 1952, p. 795).

Even when a reaction is conducted under ideal conditions using as simple reactant a methanol in large excess the yield of the beta-alkoxymonocarboxylic acid obtained may be 70% and often considerably less. See U.S. Patent No. 2,352,641, dated July 4, 1944, to Küng.

In the case of a monohydric reactant employing acid as a catalyst three types of reactions take place, depending on whether the 4-membered ring splits between the oxygen atom and the carbonyl carbon atoms, or the oxygen atom and the adjacent methylene carbon atom. This has been illustrated sometime, thus:

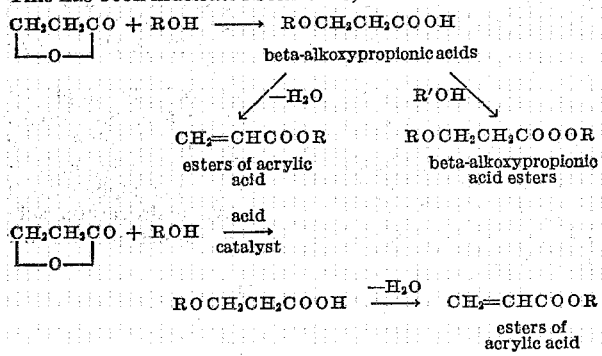

(See B. F. Goodrich Chemical Company Service Bulletin 47–SD5, November 1, 1947.) Dehydration, of course, depends on the temperature employed and other conditions. See also Journal of Americal Chemical Society, vol. 70, page 1004 (1948).

The third reaction is simply one of polymerization as has been pointed out in U.S. Patent No. 2,526,554, dated October 17, 1950, to Gresham and Jansen. For instance, the patent states as follows:

"Polyester acids produced by the reaction of an excess of beta-propiolactone with an alkanol ($R_2$—OH) in the presence of an acid catalyst. Such polyester acids possess the formula

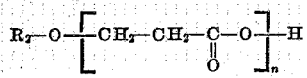

wherein $R_2$ is an alkyl radical such as methyl, ethyl, propyl, butyl, etc."

When a more complicated reactant is employed, as in the present instance, i.e., a certain specified variety of a polyhydric alcohol is used, further complications may appear. It is necessary to only point out that a free carboxyl radical resulting from a reaction of the kind previously described, could combine with an unconverted alcoholic hydroxyl to form a polyester. Indeed, the best statement in regard to the situation involving propionolactone or its equivalent and polyhydroxy compounds is stated in U.S. Patent No. 2,455,731, dated December 7, 1948, to Caldwell, in the following language:

"It is known that beta-lactones react with monohydric alcohols to produce beta-alkoxy carboxylic acids which may be converted to an alpha-beta-unsaturated carboxylic acid ester, as shown by Küng in U.S. Patent 2,352,641, dated July 4, 1944. It is also known that beta-lactones may be readily polymerized to thick, viscous, semi-solid polymers which may subsequently be hydroxyzed and dehydrated to produce alpha-beta-unsaturated carboxylic acids, as shown by Küng in U.S. Patent 2,361,036, dated October 24, 1944. I have now found that beta-propionolactone may be reacted with polyhydric alcohols having 2 to 6 free hydroxyl groups to produce valuable polymers which may be readily adapted to forming films, incorporated with cellulose esters, cellulose ethers, vinyl polymers, and the like. Other beta-lactones, similar in structure to beta-propionolactone, are not suitable for preparing the resinous polymers of my invention. It was therefore most unexpected to find that beta-propionolactone alone gave valuable polymers when reacted with a polyhydric alcohol. Although the mechanism of the condensation has not been fully investigated, it appears that beta-propionolactone undergoes some peculiar form of rearrangement or molecular orientation which is not shown by the higher members of the beta-lactone series."

Actually, the situation is more involved than suggested by what has been said previously, by reference to the above patents. See Journal American Chemical Society, volume 70, page 1004 (1948), and Journal American Chemical Society, volume 73, page 4273 (1951).

As far as we have been able to determine we have found no condition under which one could, for example, introduce a single carboxyl radical for each reactive hydroxyl radical present without simultaneously producing one or more other derivatives in an amount equivalent to the carboxy derivative. In other words, starting with a ratio of one mole of beta propiolactone, for example, for each reactive hydroxyl we have found that in all likelihood at least five cogeneric types may be formed: (1) a monocarboxylated derivative; (2) an ester formed by reaction between the monocarboxylated derivative and a hydroxyl group; (3) a hydroxy propionic acid ester; (4) an acid group of the type where 2 carboxyls have entered at a single hydroxyl position rather than one, thus

such reaction involving two moles of beta propiolactone at a single hydroxyl position means, of course, there is a residual carboxyl; however, this more complex type of carboxylic acid can in turn form an ester just the same as the simpler type; (5) and thus representing a fifth type present in the cogeneric mixture. Actually, the conventional titration between the methyl orange end point and the phenolphthalein end-point does not reveal the simple carboxylic acid alone but may reveal the type noted above where two beta lactone molecules enter at a single hydroxyl position. Likewise, when an increased ratio of beta-lactone is employed the type of acid depicted above may become more complicated. In other words, several moles of beta propiolactone may enter at a single hydroxyl position and yield an acid radical having a single carboxyl group but being of distinctly higher molecular weight. Any of such acid radicals may react with any free hydroxyl. Indeed, almost invariably and inevitably in a cogeneric mixture the simplest monocarboxy type depicted thus: —$ROCH_2CH_2COOH$, is apt to be a minor constituent and may be actually responsible for only a comparatively small amount of the end product.

The object of aforementioned U.S. Patent No. 2,455,731 is to yield a thermosetting resin. As far as we are aware if one were to treat a mole of phenolformaldehyde resin with two moles of ethylene oxide so as to convert the two terminal phenolic hydroxyl radicals into ethanol radicals, such polyol could be converted into a thermosetting resin of the kind specified in U.S. Patent No. 2,455,731. However, we use resins which have been oxylkylated to the extent that the resultant product is permanently fusible and not thermosetting in the usual sense. Stated another way, the resultant or reaction wih the seleced beta-lactone yields products which are organic solvent-soluble. In other words, they are soluble in solvents such as hydrocarbons, particularly aromatic hydrocarbons, including xylene, etc. They are generally soluble in alcohols, ethers, glycols, etherglycols, and the like. These derivatives can be dissolved in a mixed solvent consisting of a mixture of an oxygenated solvent and a nonoxygenated solvent. They can be prepared at the temperature of reaction herein described without yielding insoluble resins. Reference to the products being obtained at temperatures below the point of pyrolysis, of course, does not exclude dehydration as one of the usual reactions in light of what has been said previously.

Oxyalkylated resins can be treated with polyepoxides particularly diglycidyl ethers as described in our copending applications, Serial Nos. 349,972, filed April 20, 1953, and 343,804, filed March 20, 1953. Such oxyalkylated derivatives can be reacted with lactones as herein described in the same manner as compounds free from polyepoxide groups. This also applies to phenol-aldehyde resins which are first reacted with the polyepoxide and particularly a diglycidyl ether and then subjected to oxyalkylation. Such derivative likewise can be treated with a lactone of the kind herein described. However, these groups are not included in the instant invention.

It is to be noted that the oxyalkylated derivatives which are subjected to reaction with a suitable lactone may roughly represent two parts of the initial resin and ninety-eight percent of the alkylene oxide.

Reference is again made to U.S. Patent No. 2,499,368, dated March 7, 1950, to De Groote and Keiser. Attention is directed to that part of the text which appears in columns 28 and 29, lines 12 through 75, and lines 1 through 21, respectively. Reference is made to this test with the same force and effect as if it were herein included. This, in essence, means that the preferred product for resolution of petroleum emulsions of the water-in-oil type is characterized by the fact that a 50–50 solution in xylene or its equivalent, when mixed with one to three volumes of water and shaken will produce an emulsion.

For purpose of convenience, what is said hereinafter will be divided into four parts:

Part 1 is concerned with suitable phenol-aldehyde resins to be employed for reaction with monoepoxides;

Part 2 is concerned with the oxyalkylation of the previously described phenol-aldehyde resins;

Part 3 is concerned with the reactions between the oxyalkylated resins previously described and a suitable lactone such as beta-propiolactone;

Part 4 is concerned with the resolution of petroleum emulsions of the water-in-oil type by means of the previously-described chemical compounds or reaction products.

PART 1

This part is concerned with the preparation of phenol-aldehyde resins of the kind described in detail in U.S. Patent No. 2,499,370, dated March 7, 1950, to De Groote and Keiser, with the following qualifications: said aforementioned patent is limited to resins obtained from difunctional phenols having 4 to 12 carbon atoms in the substituent hydrocarbon radical. For the present purpose the substituent may have as many as 18 carbon atoms, as in the case of resins prepared from tetradecylphenol, substantially para-tetradecylphenol, commercially available. Similarly, resins can be prepared from hexadecylphenol or octadecylphenol. This feature will be referred to subsequently.

In addition to U.S. Patent No. 2,499,370, reference is made also to the following U.S. Patents: Nos. 2,499,365; 2,499,366; and 2,499,367, all dated March 7, 1950, to De Groote and Keiser. These patents, along with the other two previously mentioned patents, describe phenolic resins of the kind herein employed as initial materials.

For practical purposes, the resins having 4 to 12 carbon atoms are most satisfactory, with the additional $C_{14}$ carbon atom also being very satisfactory. The increased cost of the $C_{16}$ and $C_{18}$ carbon atom phenol renders these raw materials of less importance, at least at the present time.

Patent 2,499,370 describes in detail methods of preparing resins useful as intermediates for preparing the products of the present application, and reference is made to that patent for such detailed description and to Examples 1a through 103a of that patent for examples of suitable resins.

As previously noted, the hydrocarbon substituent in the phenol may have as many as 18 carbon atoms, as illustrated by tetradecylphenol, hexadecylphenol and octadecylphenol, reference in each instance being to the difunctional phenol, such as the ortho- or para-substituted phenol or a mixture of the same. Such resins are described also in issued patents, for instance, U.S. Patent No. 2,499,365, dated March 7, 1950, to De Groote and Keiser, such as Example 71a.

It is sometimes desirable to present the resins herein employed in an over-simplified form which has appeared from time to time in the literature, and particularly in the patent literature, for instance, it has been stated that the composition is approximated in an idealized form by the formula

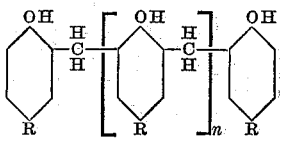

in the above formula $n$ represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6; i.e., $n$ varies from 1 to 4; R represents an aliphatic hydrocarbon substituent, generally an alkyl radical having from 4 to 14 carbon atoms, such as butyl, amyl, hexyl, decyl or dodecyl radical. Where the divalent bridge radical is shown as being derived from formaldehyde, it may, of course, be derived from any other reactive aldehyde having 8 carbon atoms or less.

In the above formula the aldehyde employed in the resin manufacture is formaldehyde. Actually, some other aldehyde such as acetaldehyde, propionaldehyde, or butyraldehyde may be used. The resin unit can be exemplified thus:

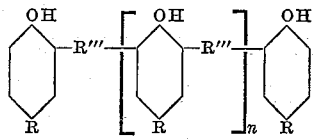

in which R''' is the divalent radical obtained from the particular aldehyde employed to form the resin.

As previously stated, the preparation of resins, the kind herein employed as reactants, is well known. See U.S. Patent No. 2,499,368, dated March 7, 1950, to De Groote and Keiser. Resins can be made using an acid catalyst or a basic catalyst or a catalyst showing neither acid nor basic properties in the ordinary sense or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although we have found that sometimes the reaction described proceeded more rapidly in the presence of a small amount of a free base. The amount may be as small as a 200th of a percent and as much as a few 100th of a percent. Sometimes moderate increase in caustic soda and caustic potash may be used. However, the most desirable procedure in practically every case is to have the resin neutral.

In preparing resins one does not get a single polymer, i.e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as, for example, 3.5; 4.5; or 5.2.

In the actual manufacture of the resins we found no reason for using other than those which are lowest in price and most readily available commercially. For purpose of convenience suitable resins are characterized in the following table:

TABLE I

| Example number | R | Position of R | R''' derived from— | n | Mol. wt. of resin molecule (based on n+2) |
|---|---|---|---|---|---|
| 1a | Phenyl | Para | Formaldehyde | 3.5 | 992.5 |
| 2a | Tertiary butyl | do | do | 3.5 | 882.5 |
| 3a | Secondary butyl | Ortho | do | 3.5 | 882.5 |
| 4a | Cyclohexyl | Para | do | 3.5 | 1,025.5 |
| 5a | Tertiary amyl | do | do | 3.5 | 959.5 |
| 6a | Mixed secondary and tertiary amyl | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |
| 28a | Tertiary amyl | do | do | 1.5 | 604.0 |
| 29a | Cyclohexyl | do | do | 1.5 | 646.0 |
| 30a | Hexyl | do | do | 1.5 | 653.0 |
| 31a | do | do | Acetaldehyde | 1.5 | 688.0 |
| 32a | Octyl | do | do | 1.5 | 786.0 |
| 33a | Nonyl | do | do | 1.5 | 835.0 |
| 34a | Octyl | do | Butyraldehyde | 2.0 | 986.0 |
| 35a | Nonyl | do | do | 2.0 | 1,028.0 |
| 36a | Amyl | do | do | 2.0 | 860.0 |
| 37a | Butyl | do | Formaldehyde | 2.0 | 636.0 |
| 38a | Amyl | do | do | 2.0 | 692.0 |
| 39a | Hexyl | do | do | 2.0 | 748.0 |
| 40a | Cyclohexyl | do | do | 2.0 | 740.0 |

PART 2

There have been issued a susbtantial number of patents which give detailed description of the preparation of oxyalkylated derivatives of resins of the kind previously described. For example, see U.S. Patents 2,499,365; 2,499,366; 2,499,367; 2,499,368; and 2,499,370, all dated March 7, 1950, to De Groote and Keiser.

More specifially, a number of other patents have appeared in which the oxyethylation step is given with considerable detail. See, for example U.S. Patents 2,581,376; 2,581,377; 2,581,378; 2,581,379; 2,581,380; and 2,581,381, all dated January 8, 1952, to De Groote and Keiser. As to further examples, see U.S. Patent 2,602,052 dated July 1, 1952, to De Groote.

The oxypropylation or, for that matter, the treatment of resins with butylene oxide, glycide, or methyl glycide, has been described in the first of the series in the above mentioned patents, i.e., those issued in 1950.

Reference is made to U.S. Patent 2,557,081, dated June 19, 1951, to De Groote and Keiser. This particular patent describes in considerable detail resins which are first treated with propylene oxide and then with ethylene oxide or with ethylene oxide and then propylene oxide or with both oxides simultaneously.

In order to avoid an extensive repetition of what is already described in detail in the patent literature, we are referring to the tables beginning in column 21 of U.S. Patent 2,581,376 and extending through column 36. We have simply numbered these products beginning with 1b, allotting, of course, five numbers to each table beginning with the first table. For convenience these sixteen tables are summarized in the following table:

TABLE II

| Example No. | Phenol | Aldehyde | Solvent, lbs. | Resin, lbs. | Ethylene oxide, lbs. |
|---|---|---|---|---|---|
| 1b | Para-tertiary amyl | Formaldehyde | 14.25 | 15.75 | 4.00 |
| 2b | do | do | 10.90 | 12.10 | 15.25 |
| 3b | do | do | 7.13 | 7.93 | 19.69 |
| 4b | do | do | 3.84 | 4.25 | 16.15 |
| 5b | do | do | 1.80 | 2.04 | 10.20 |
| 6b | Nonyl | do | 15.00 | 15.00 | 3.00 |
| 7b | do | do | 10.00 | 10.00 | 9.40 |
| 8b | do | do | 7.27 | 7.27 | 13.70 |
| 9b | do | do | 3.15 | 3.15 | 8.95 |
| 10b | do | do | 2.10 | 2.10 | 8.00 |
| 11b | Para-octyl | do | 14.20 | 15.80 | 3.25 |
| 12b | do | do | 11.10 | 12.40 | 12.50 |
| 13b | do | do | 6.64 | 7.36 | 15.00 |
| 14b | do | do | 4.40 | 4.90 | 14.80 |
| 15b | do | do | 4.10 | 4.58 | 18.52 |
| 16b | Menthyl | do | 13.65 | 16.35 | 3.00 |
| 17b | do | do | 10.00 | 12.00 | 10.75 |
| 18b | do | do | 5.48 | 6.58 | 10.85 |
| 19b | do | do | 4.10 | 4.90 | 13.15 |
| 20b | do | do | 3.10 | 3.72 | 13.43 |
| 21b | Para-secondary butyl | do | 14.45 | 15.55 | 4.25 |
| 22b | do | do | 8.48 | 9.17 | 16.00 |
| 23b | do | do | 4.82 | 5.18 | 14.25 |
| 24b | do | do | 3.85 | 4.15 | 17.00 |
| 25b | do | do | 2.65 | 2.85 | 15.45 |
| 26b | Menthyl | Propionaldehyde | 12.80 | 17.20 | 2.75 |
| 27b | do | do | 8.55 | 11.50 | 9.30 |
| 28b | do | do | 3.77 | 5.08 | 13.10 |
| 29b | do | do | 5.20 | 7.00 | 17.00 |
| 30b | do | do | 2.10 | 2.83 | 9.12 |
| 31b | Para-tertiary amyl | Furfural | 11.20 | 18.00 | 3.50 |
| 32b | do | do | 8.45 | 13.60 | 12.65 |
| 33b | do | do | 4.50 | 8.00 | 14.50 |
| 34b | do | do | 3.42 | 5.48 | 15.10 |
| 35b | do | do | 2.05 | 3.65 | 13.35 |
| 36b | Menthyl | do | 10.25 | 17.75 | 2.50 |
| 37b | do | do | 7.60 | 13.15 | 9.35 |
| 38b | do | do | 4.22 | 6.98 | 10.00 |
| 39b | do | do | 3.76 | 6.24 | 13.25 |
| 40b | do | do | 2.40 | 4.15 | 11.70 |
| 41b | Para-octyl | do | 12.10 | 18.60 | 3.00 |
| 42b | do | do | 9.25 | 14.25 | 11.00 |
| 43b | do | do | 6.72 | 10.32 | 14.91 |
| 44b | do | do | 5.52 | 8.52 | 19.81 |
| 45b | do | do | 1.75 | 2.70 | 8.40 |
| 46b | Para-phenyl | do | 13.90 | 16.70 | 3.00 |
| 47b | do | do | 10.35 | 12.45 | 12.20 |
| 48b | do | do | 8.90 | 10.70 | 19.00 |
| 49b | do | do | 5.20 | 6.26 | 16.64 |
| 50b | do | do | 3.80 | 4.32 | 15.68 |
| 51b | Para-secondary nonyl | do | 10.85 | 20.75 | 3.00 |
| 52b | do | do | 8.28 | 15.85 | 11.77 |
| 53b | do | do | 5.95 | 11.25 | 16.75 |
| 54b | do | do | 4.46 | 8.52 | 19.07 |
| 55b | do | do | 2.57 | 4.93 | 14.50 |
| 56b | | | | | |
| 57b | Para-phenyl | Formaldehyde | 11.00 | 9.00 | 11.75 |
| 58b | | | | | |
| 59b | | | | | |
| 60b | Para-phenyl | | 3.41 | 2.80 | 13.64 |
| 61b | Para-secondary butyl | Furfural | 12.00 | 17.90 | 3.50 |
| 62b | do | do | 9.35 | 13.92 | 13.23 |
| 63b | do | do | 6.25 | 8.95 | 17.00 |
| 64b | do | do | 4.35 | 6.50 | 18.40 |
| 65b | do | do | 3.02 | 4.34 | 16.49 |
| 66b | Para-octyl | Propionaldehyde | 13.30 | 16.90 | 3.00 |
| 67b | do | do | 10.20 | 12.90 | 11.30 |
| 68b | do | do | 6.46 | 8.24 | 16.50 |
| 69b | do | do | 3.86 | 4.87 | 13.02 |
| 70b | do | do | 2.94 | 3.75 | 13.26 |
| 71b | Para-nonyl | do | 10.90 | 18.00 | 3.00 |
| 72b | do | do | 8.25 | 13.60 | 11.50 |
| 73b | do | do | 5.65 | 9.35 | 15.75 |
| 74b | do | do | 3.15 | 5.25 | 13.45 |
| 75b | do | do | 1.94 | 3.21 | 10.65 |
| 76b | Para-tertiary amyl | do | 12.60 | 16.20 | 3.50 |
| 77b | do | do | 9.52 | 12.24 | 12.89 |
| 78b | do | do | 6.50 | 8.30 | 17.75 |
| 79b | do | do | 4.25 | 5.45 | 17.25 |
| 80b | do | do | 2.69 | 3.43 | 14.55 |

NOTE.—For ease of comparison, blanks (_____) appear in the above table where blanks appear in previously mentioned tables in U.S. Patent 2,581,376.

Oxypropylated derivatives comparable to 1b through 80b as described above can readily be obtained by substituting a molar equivalent amount of propylene oxide, i.e., 56 lbs. of propylene oxide, for example, for each 44 lbs. of ethylene oxide. We have prepared such a similar series but for sake of brevity only a few will be included for purposes of illustration.

TABLE III

| Example No. | Oxy-propylated analog | Phenol | Aldehyde | Solvent, lbs. | Resin, lbs. | Propylene oxide, lbs. |
|---|---|---|---|---|---|---|
| 1c | 1b | Para-tertiary amyl. | Formaldehyde. | 14.25 | 15.72 | 5.10 |
| 2c | 2b | ___do___ | ___do___ | 10.90 | 12.10 | 19.40 |
| 3c | 3b | ___do___ | ___do___ | 7.13 | 7.93 | 25.30 |
| 4c | 4b | ___do___ | ___do___ | 3.84 | 4.25 | 23.00 |
| 5c | 5b | ___do___ | ___do___ | 1.80 | 2.04 | 13.00 |
| 66c | 66b | Para-octyl | Propionaldehyde. | 13.30 | 16.90 | 3.82 |
| 67c | 67b | ___do___ | ___do___ | 10.20 | 12.90 | 14.40 |
| 68c | 68b | ___do___ | ___do___ | 6.46 | 8.24 | 21.00 |
| 69c | 69b | ___do___ | ___do___ | 3.86 | 4.87 | 16.60 |
| 70c | 70b | ___do___ | ___do___ | 2.94 | 3.75 | 16.80 |
| 76c | 76b | Para-tertiary amyl. | Formaldehyde. | 12.60 | 16.20 | 4.46 |
| 77c | 77b | ___do___ | ___do___ | 9.52 | 12.24 | 16.45 |
| 78c | 78b | ___do___ | ___do___ | 6.50 | 8.30 | 22.60 |
| 79c | 79b | ___do___ | ___do___ | 4.25 | 5.45 | 22.00 |
| 80c | 80b | ___do___ | ___do___ | 2.69 | 3.43 | 18.55 |

As an illustration of oxypropylated resins involving the use of both ethylene and propylene oxide, a reference is made to the aforementioned U.S. Patent 2,557,081, dated June 19, 1951, to De Groote and Keiser. The last table in column 28 of said patent describes in detail the preparation of a series of oxyalkylated resins in which both propylene and ethylene oxide are employed. Simply by illustration, a series of 27 compounds are included, the description of which appears in detail in said aforementioned U.S. Patent 2,577,081, to De Groote and Keiser. Note the hereto attached drawing is identical with the drawing which appears in said U.S. Patent No. 2,557,081.

Note the first series of nine componds, 1d through 9d were prepared with propylene oxide, first and then ethylene oxide. The second nine compounds, 10d through 18d inclusive, were prepared using ethylene oxide first and then propylene oxide, and the last nine compounds, 19d through 27d, were prepared by random oxyalkylation, i.e., using a mixture of the two oxides.

In the preparation of the resins, our preference is to use hydrocarbon substituted phenols, particularly para-substituted, in which the substituted radical R contains 4 to 18 carbon atoms and particularly 4 to 14 carbon atoms. The amount of alkylene oxide introduced may be comparatively large in comparison to the initial resin. For instance, there may be as much as 50 parts by weight of an oxide or mixed oxides used for each part by weight of resin employed.

It will be noted that the various resins referred to in the aforementioned U.S. Patent 2,499,370 are substantially the same type of materials as referred to in Table I. For instance, resin 3a of the table is substantially the same as 2a of the patent; resin 20a of the table is substantially the same as 34a of the patent; and resin 38a of the table is the same as 3a of the patent.

In reaction with polyepoxides, and particularly diepoxides, a large number of the previously described oxyalkylated resins have been employed. For convenience, the following list is selected indicating the previously described compounds and their molecular weights. Such resins are generally employed as a 50% solution and the polyepoxide employed is a 50% solution, usually both reactants being dissolved in xylene and sufficient sodium methylate added to act as a catalyst, for instance, 1 to 2%.

TABLE V

| Example number | Molecular weight |
|---|---|
| 1b | 1,202 |
| 2b | 2,169 |
| 3b | 3,339 |
| 4b | 4,609 |
| 5b | 5,749 |
| 6b | 1,509 |
| 7b | 2,466 |
| 8b | 3,657 |
| 9b | 5,867 |
| 10b | 6,087 |
| 1c | 1,270 |
| 2c | 2,494 |
| 3c | 4,019 |
| 4c | 6,139 |
| 5c | 7,079 |
| 1d | 1,697 |
| 2d | 1,918 |
| 3d | 3,189 |
| 4d | 23,959 |
| 5d | 23,959 |
| 6d | 24,909 |
| 7d | 23,959 |
| 8d | 1,918 |
| 9d | 1,697 |

TABLE IV

| Ex. No. | See U. S. Pat. 2,557,081 Ex. No. in above patent | See U. S. Pat. 2,557,081 Point on graph on above patent | Resin used | Resin, lbs. | Ethylene oxide, lbs. | Propylene oxide, lbs. | Wt. of xylene | Flake caustic soda, ounces |
|---|---|---|---|---|---|---|---|---|
| 1d | A | 1 | Tert. amyl phenol formaldehyde. | 6 | 3 | 1 | 10 | 1 |
| 2d | B | 5 | ___do___ | 5 | 4 | 1 | 10 | 1 |
| 3d | C | 8 | ___do___ | 3 | 6 | 1 | 10 | 1 |
| 4d | D | 2 | ___do___ | 1 | 21.5 | 2.5 | 25 | 2 |
| 5d | E | 9 | ___do___ | 1 | 15 | 9 | 25 | 2 |
| 6d | F | 6 | ___do___ | 1 | 10 | 15 | 25 | 2 |
| 7d | G | 3 | ___do___ | 1 | 2.5 | 21.5 | 25 | 2 |
| 8d | H | 7 | ___do___ | 5 | 1 | 4 | 10 | 1 |
| 9d | I | 4 | ___do___ | 6 | 1 | 3 | 10 | 1 |
| 10d | A | 1 | Tert. butyl phenol formaldehyde. | 6 | 3 | 1 | 10 | 1 |
| 11d | B | 5 | ___do___ | 5 | 4 | 1 | 10 | 1 |
| 12d | C | 8 | ___do___ | 3 | 6 | 1 | 10 | 1 |
| 13d | D | 2 | ___do___ | 1 | 21.5 | 2.5 | 25 | 2 |
| 14d | E | 9 | ___do___ | 1 | 15 | 9 | 25 | 2 |
| 15d | F | 6 | ___do___ | 1 | 10 | 14 | 25 | 2 |
| 16d | G | 3 | ___do___ | 1 | 2.5 | 21.5 | 25 | 2 |
| 17d | H | 7 | ___do___ | 5 | 1 | 4 | 10 | 1 |
| 18d | I | 4 | ___do___ | 6 | 1 | 3 | 10 | 1 |
| 19d | A | 1 | Nonyl phenol-formaldehyde. | 6 | 3 | 1 | 10 | 1 |
| 20d | B | 5 | ___do___ | 5 | 4 | 1 | 10 | 1 |
| 21d | C | 8 | ___do___ | 3 | 6 | 1 | 10 | 1 |
| 22d | D | 2 | ___do___ | 1 | 21.5 | 2.5 | 25 | 2 |
| 23d | E | 9 | ___do___ | 1 | 15 | 9 | 25 | 2 |
| 24d | F | 6 | ___do___ | 1 | 10 | 14 | 25 | 2 |
| 25d | G | 3 | ___do___ | 1 | 2.5 | 21.5 | 25 | 2 |
| 26d | H | 7 | ___do___ | 5 | 1 | 4 | 10 | 1 |
| 27d | I | 4 | ___do___ | 6 | 1 | 3 | 10 | 1 |

PART 3

As stated previously, the final reaction involves the use of a beta lactone of the kind characterized by beta-propiolactone and an oxyalkylated phenol-aldehyde resin of the kind previously noted. The amount of lactone used may be as little as two moles of the propiolactone per mole of oxyalkylated resin or may be as much as 3 to 6 or even 10 moles of the lactone for each hydroxyl group present in the oxyalkylated molecule.

As is well known, beta-propiolactone reacts readily, in fact, comparable to the more reactive acid anhydrides. Generally speaking, we have conducted the reaction in the presence of an inert solvent such as benzene, toluene, xylene, or a mixture and at a temperature from the boiling point of water to slightly above that temperature. Generally speaking, the range of 100° C. to 130° C. is perfectly satisfactory and in any event we have limited the temperature to 175° or less.

A catalyst is employed, preferably an acid catalyst present in the amount of about .2% to not over 1%. The catalyst can be any suitable inorganic acid such as sulfuric acid, hydrochloric acid, phosphoric acid, or may be an organic acid, such as an aromatic sulfonic acid, including para-toluene sulfonic acid. It is sometimes convenient to use a mixture of xylene, and benzene so the mixture doubles at 120° to 135° C. and permits the reaction mass to reflux at this temperature in presence of .5% catalyst for approximately 2 to 4 hours. At the end of the reaction period the acid catalyst could be neutralized if desired and the product can be filtered.

The products can be bleached by the use of filtering clays, chars or the like so as to obtain products having either a straw color or are almost water-white. Some of the products have a yellowish amber or reddish shade but this is of no significance for the uses for which the products are usually employed.

The reaction should be conducted under anhydrous or substantially anhydrous conditions. Our preference is to dissolve the oxyalkylated resin, preferably as a neutral product, in a suitable amount of xylene and benzene and then reflux in presence of the acid catalyst until no water shows in the phase-separating trap. We then prefer to cool the product back to 60° C. with continued stirring and add the beta-propiolactone dropwise and continue stirring and then raise the temperature up to the reflux point. It is quite possible that refluxing at the temperature indicated, 130° C., or modestly higher, completes the reaction within one-half to one hour but to be on the safe side we have invariably employed a reflux period of 2 to 4 hours. A somewhat higher temperature can be employed, and as the temperature increases it appears there is a tendency for the free acid value to drop off. As pointed out previously the product of reaction has a saponification value and also an acid value. The saponification value may be due in part to a polymerized hydroxy acid radical and also may be due in part to an ester radical involving either an unpolymerized acid radical or a polymerized acid radical, and a hydroxyl group. There is no objection to using a higher temperature or longer period of time provided only the final products still remain soluble in xylene or an equivalent organic solvent.

Using the reactants herein described in the proportions described and under the conditions described the products of reaction are invariably organic solvent-soluble. Even if freed of solvent and heated at a somewhat higher temperature the products are apt to remain fusible or thermoplastic up to their decomposition point, or gelation point.

*Example 1e*

In a suitable reaction vessel 122.8 grams of oxyalkylated resin, previously identified as Example 4c, were mixed with 126 grams of xylene and one gram of sulfuric acid. The mixture was heated slowly to approximately 70° C. and then 2.9 grams of beta-propiolactone added slowly. The temperature was then raised to approximately 125° C. and held at this point for 2 hours. At the end of this time tests showed the reaction was complete. There was no unreacted beta-propiolactone.

Table VI following gives a large number of examples in tabular form including all pertinent data.

The finished product has substantially the same appearance as the initial oxyalkylated resin except that it was somewhat more reddish in color and a bit more viscous in absence of solvent. In other instances there was a definite increase in viscosity, especially when higher ratios of lactone were employed.

TABLE VI

| Ex. No. | Oxyalkylated resin | Amt. gms. | Lactone | Amt. gms. | Molar ratio | Catalyst (conc. $H_2SO_4$) gms. | Solvent (xylene) gms. | Max. reaction temp. °C. | Time of reaction (hrs.) |
|---|---|---|---|---|---|---|---|---|---|
| 1e | 4c | 122.8 | Beta-propiolactone | 2.9 | 1:2 | 1 | 126 | 125 | 2 |
| 2e | 4c | 122.8 | do | 14.4 | 1:10 | 1 | 137 | 115 | 3 |
| 3e | 4c | 122.8 | do | 28.8 | 1:20 | 1 | 152 | 110 | 3 |
| 4e | 5c | 141.6 | do | 2.9 | 1:2 | 1 | 145 | 121 | 2 |
| 5e | 5c | 141.6 | do | 14.4 | 1:10 | 1 | 156 | 110 | 3 |
| 6e | 5c | 141.6 | do | 28.8 | 1:20 | 1 | 170 | 115 | 3 |
| 7e | 6d | 249.1 | do | 1.5 | 1:2 | 2 | 251 | 118 | 2 |
| 8e | 6d | 249.1 | do | 7.2 | 1:10 | 2 | 256 | 115 | 2 |
| 9e | 6d | 249.1 | do | 14.4 | 1:20 | 2 | 264 | 110 | 3 |
| 10e | 7d | 239.6 | do | 1.5 | 1:2 | 2 | 241 | 120 | 2 |
| 11e | 7d | 239.6 | do | 7.2 | 1:10 | 2 | 247 | 116 | 2 |
| 12e | 7d | 239.6 | do | 14.4 | 1:20 | 2 | 250 | 118 | 3 |
| 13e | 4c | 122.8 | Beta-valerolactone | 10.0 | 1:5 | 1 | 133 | 125 | 3 |
| 14e | 4c | 122.8 | do | 20.0 | 1:10 | 1 | 143 | 122 | 4 |
| 15e | 5c | 141.6 | do | 10.0 | 1:5 | 1 | 152 | 122 | 3 |
| 16e | 5c | 141.6 | do | 20.0 | 1:10 | 1 | 162 | 125 | 4 |
| 17e | 6d | 249.1 | do | 5.0 | 1:5 | 2 | 254 | 130 | 2 |
| 18e | 6d | 249.1 | do | 10.0 | 1:10 | 2 | 259 | 128 | 3 |
| 19e | 7d | 239.6 | do | 5.0 | 1:5 | 2 | 245 | 123 | 2 |
| 20e | 7d | 239.6 | do | 10.0 | 1:10 | 2 | 250 | 125 | 3 |

PART 4

As to the use of conventional demulsifying agents reference is made to U.S. Patent No. 2,626,929, dated January 7, 1953, to De Groote, and particularly to Part 3. Everything that appears therein applies with equal force and effect to the instant process, noting only that where reference is made to Example 13b in said text beginning in column 15 and ending in column 18, reference should be to Example 4e, herein described.

Having thus described our invention what we claim as new and desire to secure by Letters Patent is:

1. The process of breaking petroleum emulsions of the water-in-oil type characterized by subjecting the emulsion to the action of a demulsifier including synthetic hydrophile products obtained by the chemical modification of (AA) hydrophile synthetic products;

said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide; and (B) an oxyalkylation-susceptible, fusible, organic solvent-soluble, water-insoluble phenol-aldehyde-resin; said resin being derived by reaction between a difunctional monohydric phenol and an aldehyde having not over 8 carbon atoms and reactive toward said phenol; said resin being formed in the substantial absence of trifunctional phenols; said phenol being of the formula

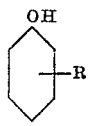

in which R is a hydrocarbon radical having at least 4 and not more than 18 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals and $n$ is a numeral varying from 1 to 40; with the proviso that at least 2 moles of alkylene oxide be introduced for each phenolic nucleus; by reaction with (BB) a beta-lactone of the formula

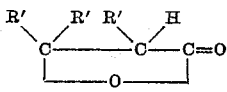

wherein R' is a radical selected from the group consisting of hydrogen and unreactive alkyl, aryl, aralkyl and cycloalkyl radicals; said reaction being conducted in a substantially anhydrous state in absence of an alkaline catalyst and at a temperature at least sufficiently high to induce lactone ring cleavage, and below the point of pyrolysis; with the proviso that the products of reaction be organic solvent-soluble, the molar ratio of reactants being at least 2 moles of the lactone for each mole of oxyalkylated resin and not in excess of 6 moles of the lactone for each hydroxyl group present in the oxyalkylated phenol-aldehyde resin.

2. The process of claim 1 in which the beta-lactone employed in the chemical modification contains less than 6 carbon atoms.

3. The process of claim 1 in which the beta-lactone employed in the chemical modification is propiolactone.

4. The process of claim 1 wherein the beta-lactone employed in the chemical modification is propiolactone and the reaction is conducted in presence of an acid catalyst.

5. The process of claim 1 wherein the beta-lactone employed in the chemical modification is propiolactone and the reaction is conducted in presence of an acid catalyst at a temperature not in excess of 175° C.

6. The process of claim 1 wherein the beta-lactone employed in the chemical modification is propiolactone and the reaction is conducted in presence of an acid catalyst at a temperature not in excess of 175° C., and with the proviso that the hydrophile properties of the final reaction product in an equal weight of xylene are sufficient to produce an emulsion when said xylene solution is shaken vigorously with one to three volumes of water.

7. The process of breaking petroleum emulsions of the water-in-oil type characterized by subjecting the emulsion to the action of a demulsifier including synthetic hydrophile products obtained by the chemical modification of (AA) hydrophile synthetic products; said hydrophile synthetic products being oxyalkylation products of (A) both ethylene oxide and propylene oxide; and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

in which R is a hydrocarbon radical having at least 4 and not more than 14 carbon atoms and substituted in the 2,4,6 position; said oxyalkylated resin being characterized by the introduction into the resin molecule of a plurality of divalent $C_2H_4O$ and $C_3H_6O$ radicals, with the proviso that the composition of said hydrophile synthetic products, based on a statistical average and assuming completeness of reaction, and calculated back to the three oxyalkylation-step reactions, i.e., resin, ethylene oxide and propylene oxide, on a percentage weight basis must fall approximately within the area defined by the trapezoid, 1,2,3 and 4 of the chart in the accompanying drawing; by reaction with (BB) beta-propiolactone; said reaction being conducted in a substantially anhydrous state in presence of an acid catalyst and at a temperature sufficiently high to induce lactone ring cleavage and below 175° C., with the proviso that the products of reaction be organic solvent-soluble, the molar ratio of reactants being at least 2 moles of the lactone for each mole of oxyalkylated resin and not in excess of 6 moles of the lactone for each hydroxyl group present in the oxyalkylated phenol-aldehyde resin; and with the final proviso that the hydrophile properties of the final reaction product in an equal weight of xylene are sufficient to produce an emulsion when said xylene solution is shaken vigorously with one to three volumes of water.

8. The process of claim 7 with the proviso that the three oxyalkylation step reactants, i.e., resin, ethylene oxide and propylene oxide on a percentage basis must fall within the area defined by the parallelogram 5, 6, 3 and 7 on the chart in accompanying drawing.

References Cited in the file of this patent

UNITED STATES PATENTS

| | | |
|---|---|---|
| 2,414,729 | Fleming | Jan. 21, 1947 |
| 2,430,002 | De Groote et al. | Nov. 4, 1947 |
| 2,454,544 | Bock et al. | Nov. 23, 1948 |
| 2,507,910 | Keiser et al. | May 16, 1950 |
| 2,518,668 | De Groote et al. | Aug. 15, 1950 |
| 2,615,853 | Kirkpatrick et al. | Oct. 28, 1952 |